Patented July 10, 1928.

1,677,117

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

ISO-BUTYRYL RESORCINOL.

No Drawing.   Application filed April 29, 1925.   Serial No. 26,812.

This invention relates to iso-butyryl resorcinol have the general formula

The new iso-acyl resorcinols of the present invention may be prepared by reacting with the iso-butyric acid on resorcinol in the presence of a condensing agent, such as zinc chloride. The iso-butyryl resorcinol thus produced may be purified, for example, by distillation in a vacuum, and by recrystallization from various solvents or mixtures of solvents.

The iso-butyryl resorcinol of the present invention may be produced in the form of an oil, or when purified to substantial purity, may be obtained as crystallized product.

The new iso-butyryl resorcinol can be produced, for example, by the process of the following specific example:

20 parts of anhydrous zinc chloride are dissolved in 100 parts of iso-butyric acid, the solution being aided by heating and stirring. The temperature is maintained near 135° C. and about 33 parts of resorcinol are gradually added over a period of about 20 minutes and the reaction mixture is then stirred for a period of about three hours at a temperature of about 135 to 145° C. At the end of this time, an equal volume of water is added and the mixture is further stirred. An oily reaction product rises to the surface, is separated from the aqueous layer and washed with an equal volume of water and the water then separated from the washed product. The washed product is then distilled in vacuo; the traces of water and excess iso-butyric acid being first distilled off and finally the iso-butyryl resorcinol distilling over. The iso-butyryl resorcinol may be further purified by redistillation and crystallization from toluene or mixtures of toluene and petroleum ether. On redistillation the distillate solidifies to a crystalline product. When recrystallized from toluene or a mixture of toluene and petroleum ether, iso-butyryl resorcinol has a melting point of about 67–68.5° C. and a boiling point at 6 to 7 mm. of 173 to 175° C.

As iso-butyric acid is somewhat soluble in water some of the acid may be lost in washing and can be recovered from the wash water by adding calcium chloride which precipitates out the acid from the solution. In the case of higher acids, above iso-butyric acid, the solubility of the acid in water is so slight as to render the losses by washing negligible.

In this example the temperature can be somewhat varied, but in general it should be above 135° and not appreciably higher than 145°, the temperature being kept below that which will cause objectionable condensation of resorcinol with itself to form undesirable by-products. The mixture of zinc chloride and fatty acid is also advantageously heated to the above reaction temperature, e. g. around 135° to 145° C. before the resorcinol is added, so that the reaction will take place immediately and continuously as the resorcinol is added to the reaction mixture.

The iso-butyryl resorcinol of the present invention may be obtained in a pure crystalline state, or it may be produced and used in the form of an oil, without final purification, e. g., for the production of other compounds, such as the production of alkyl resorcinols, by reduction, in accordance with the process set forth in a companion application.

This application is a continuation in part of my prior application Serial No. 654,928, filed July 31, 1923.

I claim:

1. A new product comprising iso-butyryl resorcinol having the following formula

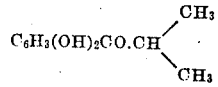

2. As a new product pure iso-butyryl resorcinol having the following formula

being a crystalline solid having a melting point of about 67–68.5° C. and boiling at 173–175° C. under 6–7 mm. pressure.

In testimony whereof I affix my signature.

ALFRED R. L. DOHME.